US005977667A

United States Patent [19]

Hirose

[11] Patent Number: 5,977,667

[45] Date of Patent: Nov. 2, 1999

[54] ENGINE-OPERATED GENERATOR

[75] Inventor: Tadafumi Hirose, Wako, Japan

[73] Assignee: Honda giken Kogyo Kabushiki Kaisha, Tokyo, Japan

[21] Appl. No.: 09/121,431

[22] Filed: Jul. 23, 1998

[30] Foreign Application Priority Data

Jul. 24, 1997 [JP] Japan .................................... 9-198668

[51] Int. Cl.[6] .............................. H02K 7/14; H02K 5/24; H02K 9/00; H02P 9/04

[52] U.S. Cl. ................................ 310/51; 310/50; 310/63; 310/89; 290/1 B

[58] Field of Search ................................ 310/47, 48, 50, 310/51, 59, 62, 63, 88, 89; 290/1 A, 1 B; 123/2, 3

[56] References Cited

U.S. PATENT DOCUMENTS

| | | | |
|---|---|---|---|
| 3,259,752 | 7/1966 | Honda | 291/1 |
| 4,122,353 | 10/1978 | Noguchi | 290/1 A |
| 4,293,756 | 10/1981 | Hoyt, Jr. et al. | 219/133 |
| 4,595,841 | 6/1986 | Yaguchi | 290/2 A |
| 4,608,946 | 9/1986 | Tanaka et al. | 123/2 |
| 4,647,835 | 3/1987 | Fujikawa et al. | 322/1 |
| 4,702,201 | 10/1987 | Odo et al. | 123/2 |
| 4,859,886 | 8/1989 | Tanaka et al. | 310/51 |

FOREIGN PATENT DOCUMENTS 64-3777 2/1989 Japan .

*Primary Examiner*—Nestor Ramirez
*Assistant Examiner*—Dang Dinh Le
*Attorney, Agent, or Firm*—Carrier, Blackman & Associates, P.C.; Joseph P. Carrier; William D. Blackman

[57] ABSTRACT

A compact engine-operated generator unit having a high soundproof effect in which a generator thereof can be cooled efficiently as well as an engine and a muffler thereof. The engine-operated generator has an engine and a generator driven by the engine arranged in a row with a common rotary axis and accommodated in a soundproof case. The generator, the engine and the muffler are arranged in order within the soundproof case and covered by a duct to be isolated from other instruments in the soundproof case; the duct has an end on the side of the generator opening to an interior of the soundproof case and another end on the side of the muffler opening to an exterior of the soundproof case; and a cooling fan is driven by the engine so that air in the soundproof case is inhaled through end opening of the duct on the side of the generator into the duct, sequentially cools the generator, the engine and the muffler in order and then is discharged through the end opening of the duct on the side of the muffler to the exterior.

15 Claims, 7 Drawing Sheets

ENGINE-OPERATED GENERATOR

BACKGROUND OF THE INVENTION

1. Field of the Invention

The present invention relates to an engine-operated generator covered by a soundproof case in its entirety.

2. Discussion of Relevant Art

The engine-operated generator in which an engine and a generator driven by the engine are integrated is used at a construction work site generally. And in consideration of influences to the surroundings when it is operated in a city area especially at night, an engine-operated generator covered by a soundproof case in its entirety has been used widely in order to restrain operation noise to as low a level as possible.

In this kind of engine-operated generator, openings for suctioning or discharging air are made few in number and small in size to achieve necessary low noise level during operation. But on the one hand, it is necessary to devote great care to cooling the interior of the soundproof case because the area of the openings is small.

Japanese Utility Model Publication No. 64-3777 discloses an engine-operated generator in which an engine and a muffler are covered by a duct to be isolated from other instruments and cooling air is forcibly passed through the duct and discharged at the side of the muffler out of the soundproof case so that high temperature cooling air is property discharged and prevented from recirculating into the soundproof case.

However, as for a generator placed outside of the duct in the soundproof case, it is necessary to provide another cooling air passage than the above duct or an exclusive cooling fan for the generator, and therefore the engine-operated generator is caused to be large-sized.

In the engine-operated generator of the Japanese Utility Model Publication No. 64-3777, a fan for cooling the generator is provided separately from a cooling fan for passing air forcibly through the duct covering the engine and the muffler, and air discharged from the fan for cooling the generator is joined in the duct after cooling the generator. Therefore, there is a problem that the air from the generator cooling fan requires a certain high discharge pressure to join in the duct and it is not necessarily an efficient cooling system.

SUMMARY OF THE INVENTION

The present invention has been accomplished in view of the foregoing and one object of the invention is to provide a compact engine-operated generator having a high soundproof effect in which a generator can be cooled efficiently as well as an engine and a muffler.

In order to attain the above object, the present invention provides an engine-operated generator unit having an engine with an output rotary shaft and a generator driven by the engine arranged in a direction coaxial with the rotary shaft and accommodated in a soundproof case, wherein the generator, the engine and a muffler are arranged in order within the soundproof case and covered by a duct so as to be isolated from other instruments in the soundproof case; the duct has an end on the side of the generator opening to an interior of the soundproof case and another end on the side of the muffler opening to an exterior of the soundproof case; and a cooling fan is driven by the engine so that air in the soundproof case is inhaled into the duct, sequentially cools the generator, the engine and the muffler in order and then is discharged through the other opening of the duct on the side of the muffler to the exterior.

Since the air inhaled into the duct through the opening on the side of the generator cools the generator of relatively low temperature initially and then cools in order the engine and the muffler of higher temperatures to be discharged through the opening on the side of the muffler to the exterior, the generator is cooled efficiently as well as the engine and the muffler.

A high soundproof effect can be achieved because the engine is covered by the duct and the soundproof case doubly. The generator, the engine and the muffler need only to be arranged in order within the duct and they may be arranged in a L-shape, for example, utilizing space within the soundproof case efficiently to make the apparatus compact.

The generator may be an outer-rotor type generator having an outer-rotor which serves as a flywheel of the engine and the cooling fan may be provided in the opening of the duct on the side of the generator integrally with the outer-rotor.

Since the outer-rotor of the generator serves as the flywheel of the engine, length of the engine-operated generator in the axial direction can be made short. Since the cooling fan is attached to the outer-rotor integrally, a cooling fan of large capacity can be provided easily and a high supporting strength for the fan can be obtained.

The engine may have a cylinder inclined sideways obliquely and the muffler may be disposed in a space above the cylinder.

Since a large muffler can be disposed in the space which is formed above the engine by inclining the cylinder, the size in the vertical direction as well as the size in the axial direction can be restrained small to attempt miniaturization of the apparatus. Further, a reasonable cooling air stream can be generated for efficient cooling, because the hotter portion is positioned at the higher position.

The muffler may be elongated in a direction perpendicular to a rotary shaft of the engine. The muffler of large capacity can be disposed in the space above the inclined cylinder with the vertical size of the apparatus restrained small.

The generator may be an outer-rotor type multipolar generator having a magnet rotor, and a control circuit for converting an output of the generator into an alternating current of a predetermined frequency may be provided.

It is further possible to make the axial size of the generator small and lower the rotational speed of the generator when the load is not large to reduce operation noise greatly.

DETAILED DESCRIPTION OF THE PREFERRED EMBODIMENT

Hereinafter, a preferred embodiment of the present invention will be described with reference to FIGS. 1 to 7.

Figure 1:
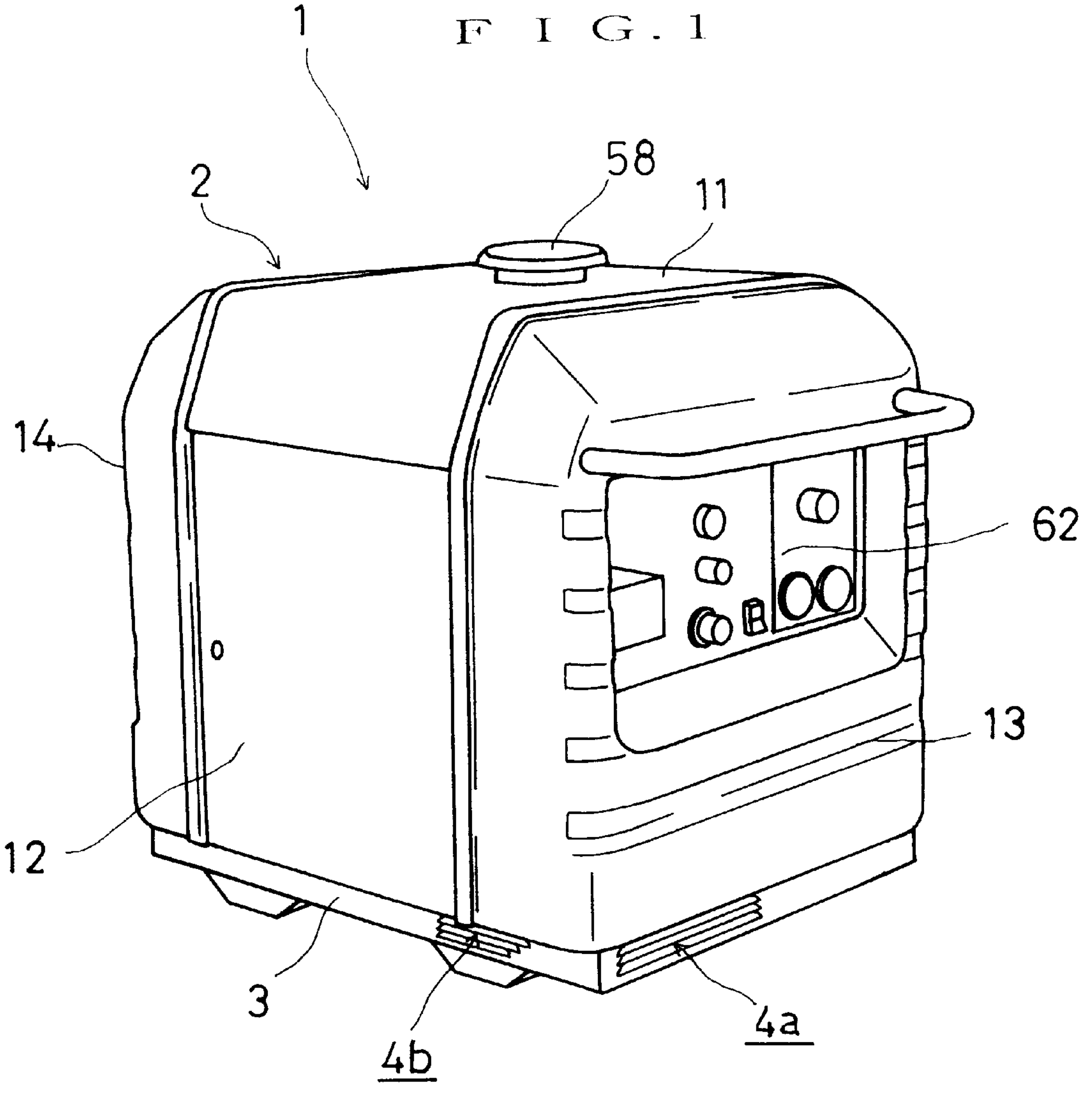
FIG. 1 is an outside perspective view of an engine-operated generator according to a preferred embodiment of the present invention.

The engine-operated generator 1 according to the preferred embodiment is covered with a soundproof case 2 in its entirety to form a cube as shown in FIG. 1.

Figure 2:
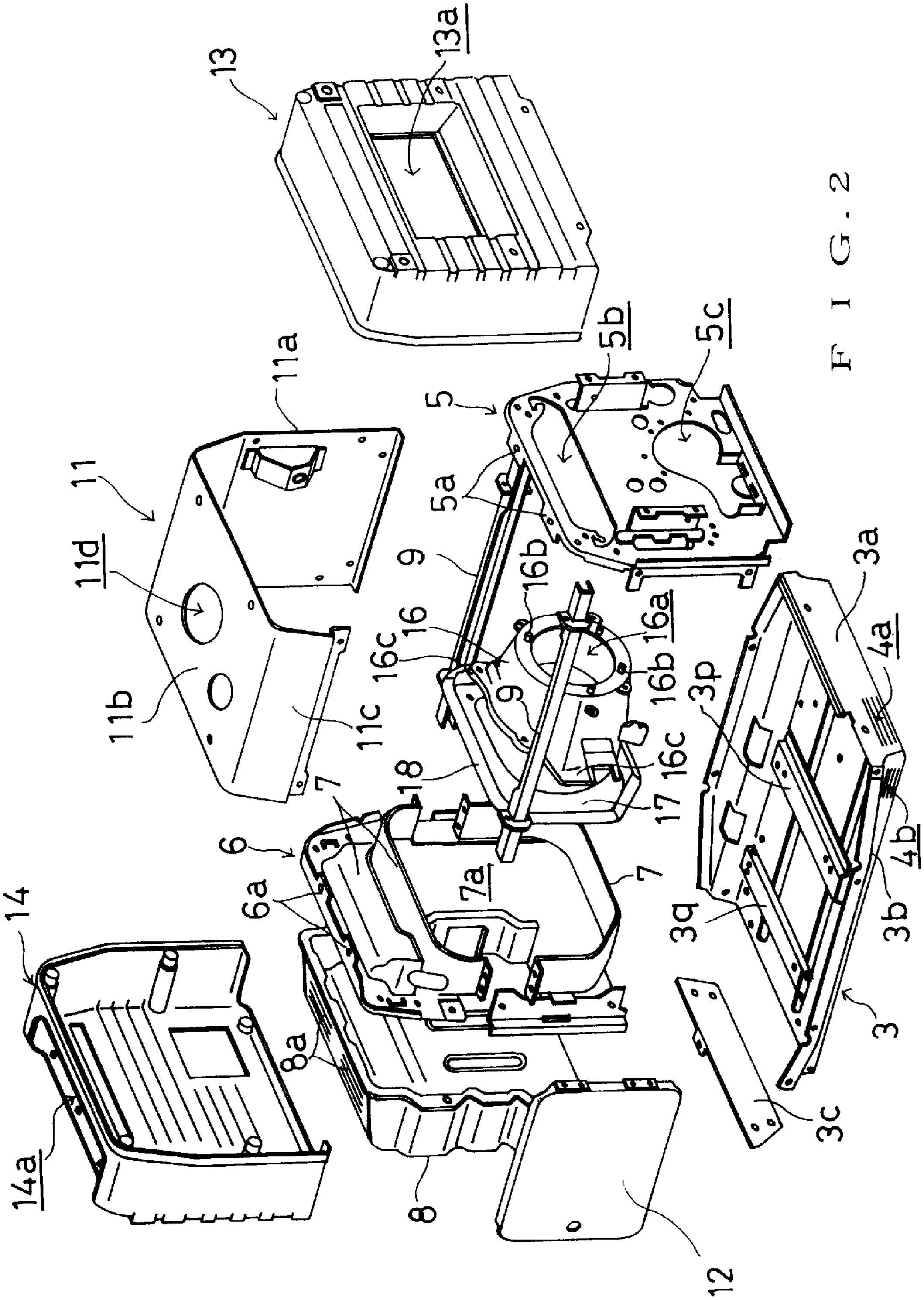
FIG. 2 is an exploded perspective view of a soundproof case and inner frame members of the embodiment of FIG. 1.

FIG. 2 is an exploded perspective view of the soundproof case 2 and other inner frame members. An under frame member 3 is formed in a shape of a flat saucer and has a front side wall 3*a*, a right side wall 3*b* and a rear side wall 3*c*. The front and right side walls 3*a*, 3*b* are provided with suction holes 4*a*, 4*b*. The rear side wall 3*c* is detachable. On the inner side of the under frame member 3 are laid a pair of front and rear supporting members 3*p*, 3*q* extending in the right-left direction in parallel with each other.

On the under frame member 3 are erected substantially rectangular front and rear frame members 5, 6 facing to each other at a predetermined interval.

Upper edge portions of the front frame member 5 are bent rearward to form flanges 5*a*. A rectangular panel portion of the front frame member 5 has a rectangular open hole 5*b* elongated in the right-left direction at an upper part and a communication open hole 5*c* formed in a shape of a partly swelled circle at a lower part.

On the one hand, the rear frame member 6 is split into upper and lower parts and a large rectangular central through hole 7*a* is formed when the upper and lower parts are joined. From the through hole 7*a* is projected forward a duct 7 formed integrally with the rear frame member 6. Upper edge portions of the rear frame member 6 are bent forward to form flanges 6*a*. The front portion of the duct 7 is shaped in a rectangular pipe opening to the front.

A duct 8 made of glass wool is disposed behind the rear frame member 6. The duct 8 swells out rearward communicating with the duct 7 through the through hole 7*a*. The duct 8 is shaped in a substantially rectangular box opening toward the front and bottom and having a discharge hole 8*a* at an upper side wall.

Between the front frame member 5 and the rear frame member 6 elected on the under frame member 3, a pair of right and left reinforcing rails 9, 9 are provided directed in front-rear direction and penetrating upper corners of the frame members 5, 6.

A center cover 11 shaped as a halved square pipe is placed along outer peripheral edges of the front and rear frame members 5, 6 for covering the space between the frame members 5, 6 to partition the space from the exterior.

The center cover 11 is formed in a shape of a half of a square pipe by bending a plate and has a left side wall 11*a*, an upper wall 11*b* and a right upper side wall 11*c*. The right under side of the center cover 11 is covered by an opening and closing separate lid member 12 to partition a center compartment 22 (FIG. 3) therein. In the upper wall of the center cover 11 is formed a circular hole lid through which a refueling mouth 55*b* of a fuel tank 55 projects (FIG. 4).

A front of the front frame member 5 is covered by a front cover 13 shaped in a generally rectangular box shape to partition a front compartment 21. A rear of the rear frame member 6 is covered by a rear cover 14 shaped in a generally rectangular box shape to partition a rear compartment 23. Along the inner surface of the rear cover 14 extends the aforementioned glass wool duct 8 as a liner. Therefore, the rear compartment 23 is formed inside of the duct 8.

A central portion of a front wall of the front cover 13 is recessed and there is formed a rectangular opening 13*a* for a control panel 62. In an upper wall of the rear cover 14 is formed a rectangular opening 14*a* corresponding to the discharge hole 8*a* provided on the aforementioned duct 8.

As mentioned above, the soundproof case 2 constituting an outer wall of the engine-operated generator 1 has six faces formed by the under frame member 3, the center cover 11, the lid member 12, the front cover 13 and the rear cover 14. And inner space of the soundproof case 2 is partitioned into the front compartment 21, the center compartment 22 and the rear compartment 23 by the front frame member 5 and the rear frame member 6.

In addition, within the center compartment is provided a fan cover 16, which serves as a duct too, continuously to the rectangular-pipe-like section of the duct 7 swelling out into the center compartment 22 from the rear frame member 6. The fan cover 16 is formed about cylindrical to cover a generator 35 and a centrifugal fan 40 and has a suction opening 16*a* which is a circular opening at the front end. On a circular end surface at the suction opening 16*a* are provided a plurality of projections 16*b* having predetermined lengths.

The fan cover 16 has a flange 16*c* projecting radially outward at the opening rear end and a rectangular frame member 17 is attached to the flange 16*c* from the rear. The rectangular frame member 17 is surrounded by a seal rubber 18 along the rectangular outer peripheral edge and fitted in the rectangular-pipe-like section of the duct 7 being sealed by the seal rubber 18.

Namely, the fan cover 16 is connected with the duct 7 of the rear frame member 6 through the rectangular frame member 17 and the duct 7 is connected with the duct 8 which swells out rearward from the rear frame member 6 to form the rear compartment 23.

Therefore, within the soundproof case 2, a duct space formed by the fan cover 16, the duct 7 and the duct 8, considered collectively, provides a duct means for channeling air. The duct means occupies the rear compartment 23 and a part of the center compartment 22. The duct means has an upper stream side suction opening 16*a* opening into the center compartment 22 and a lower stream side discharge opening 8*a* provided in the upper side wall of the duct 8. The discharge opening 8*a* faces the rectangular opening 14*a* of the rear cover 14 and opens to the exterior of the soundproof case 2.

On the above-mentioned frame construction and duct construction within the soundproof case 2 are disposed various instruments. The engine 30 is accommodated in the ducts 7, 8 at the rear of the soundproof case 2 as shown in FIG. 4, and supported by a pair of right and left vibrationproof mount members 31 fixed to the supporting member 3*q* on the under frame member 3 (FIGS. 4 and 6).

Figure 6:
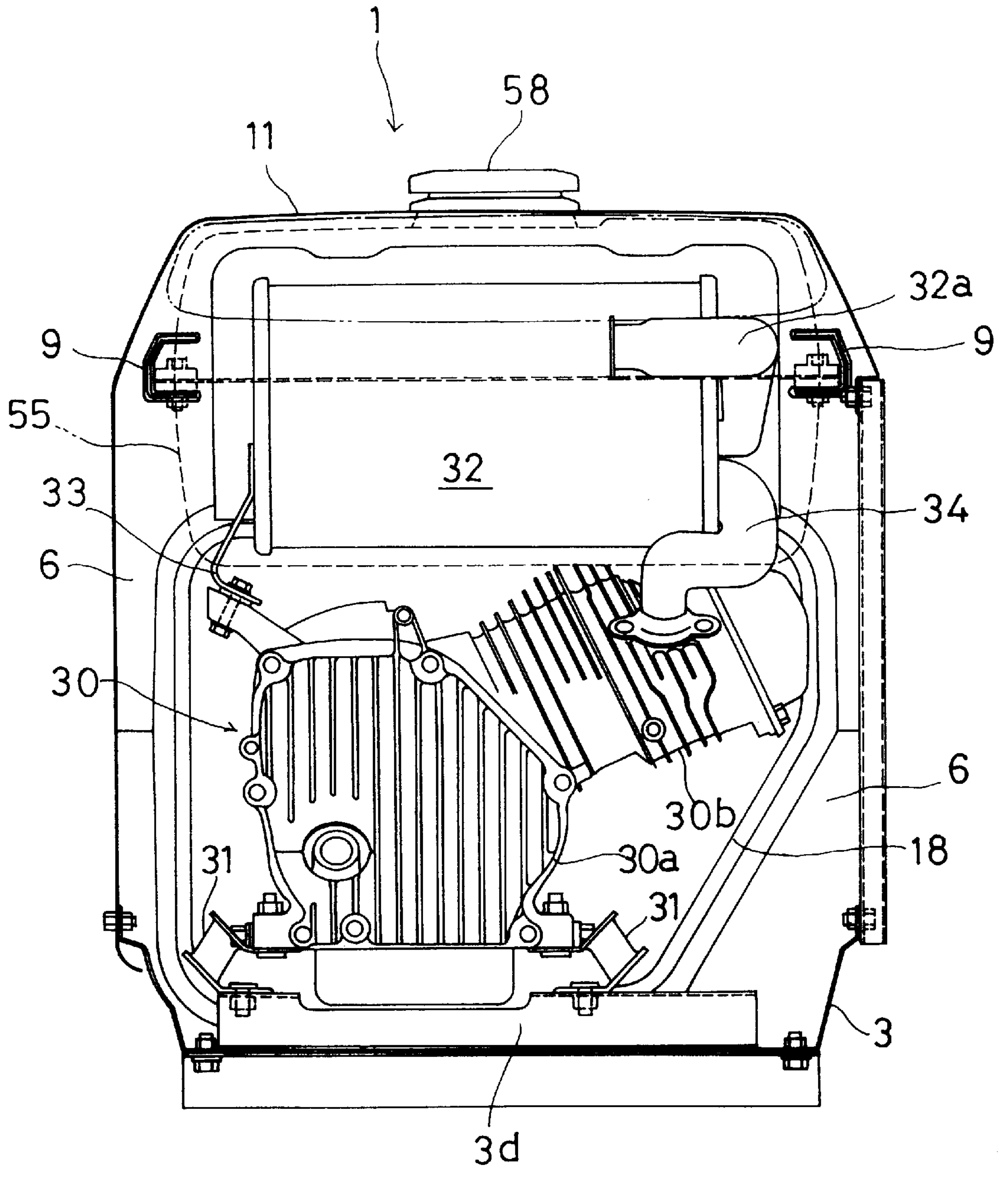
FIG. 6 is a rear view thereof.

As shown in FIG. 6, the engine 30 has a crankcase 30*a* positioned biased to the left side, a cylinder 30*b* projecting inclined to the right direction somewhat upwardly and a crankshaft 30*c* directed in front-rear direction horizontally and projecting forward.

Since the cylinder 30*b* of the engine 30 is inclined as mentioned above, a large upper space can be ensured in the ducts 7, 8, and in this space, a large cylindrical muffler 32 is disposed directed in right-left direction. The muffler 32 is supported by the engine by means of a bracket 33 and an exhaust pipe 34 extending upward from the cylinder 30*b* is connected with the muffler 32. A tail pipe 32*a* extends around the muffler 32 from a right side wall to a rear face thereof, and an exhaust opening of the tail pipe is positioned in the vicinity of the discharge opening 8*a*.

The generator 35 is connected to the crankshaft 30*c* projecting forward from the crankcase 30*a*. The generator 35 is an outer-rotor type multipolar generator having an outer-rotor 36 shaped in a bottomed cylinder fixed to the crankshaft 30*c* integrally. A plurality of magnets 36*a* are stuck circumferentially on an inner surface of a peripheral wall of the rotor 36 so as to rotate together with the crankshaft 30*c*. The outer-rotor 36 serves as a flywheel of the engine, too.

The outer-rotor 36 has a bottom wall at the front and opens rearward. As for the inner stator 37 of the generator 35, a stator core having a plurality of radial yokes and generating coils wound on the yokes is fixed to the crankcase 30*a*.

The bottom wall of the outer-rotor 36 is formed with a plurality of ventilating holes 36*b* and the centrifugal fan 40 is fixed to the bottom wall of the outer-rotor 36 from the front.

The centrifugal fan 40 is a two faces fan having fan blades 41, 42 on both front and rear faces of a disk-like base plate 40*a*. The fan cover 16 covers the generator 35 and the centrifugal fan 40 with the suction opening 16*a* at the front end opposed to the centrifugal fan 40. The rear end of the fan cover 16 is fixed to the crankcase 30*a* of the engine 30 together with the rectangular frame member 17.

In front of the fan cover 16, a recoil starter 45 is provided opposite to the suction opening 16*a*. A predetermined space is left between the recoil starter 45 and the fan cover 16 by the projection 16*b* on the end surface surrounding the suction opening 16*a* of the fan cover 16. A boss section 46*b* of a starter case 46 of the recoil starter 45 is fixed to the fan cover 16 to be supported integrally.

Figure 3:
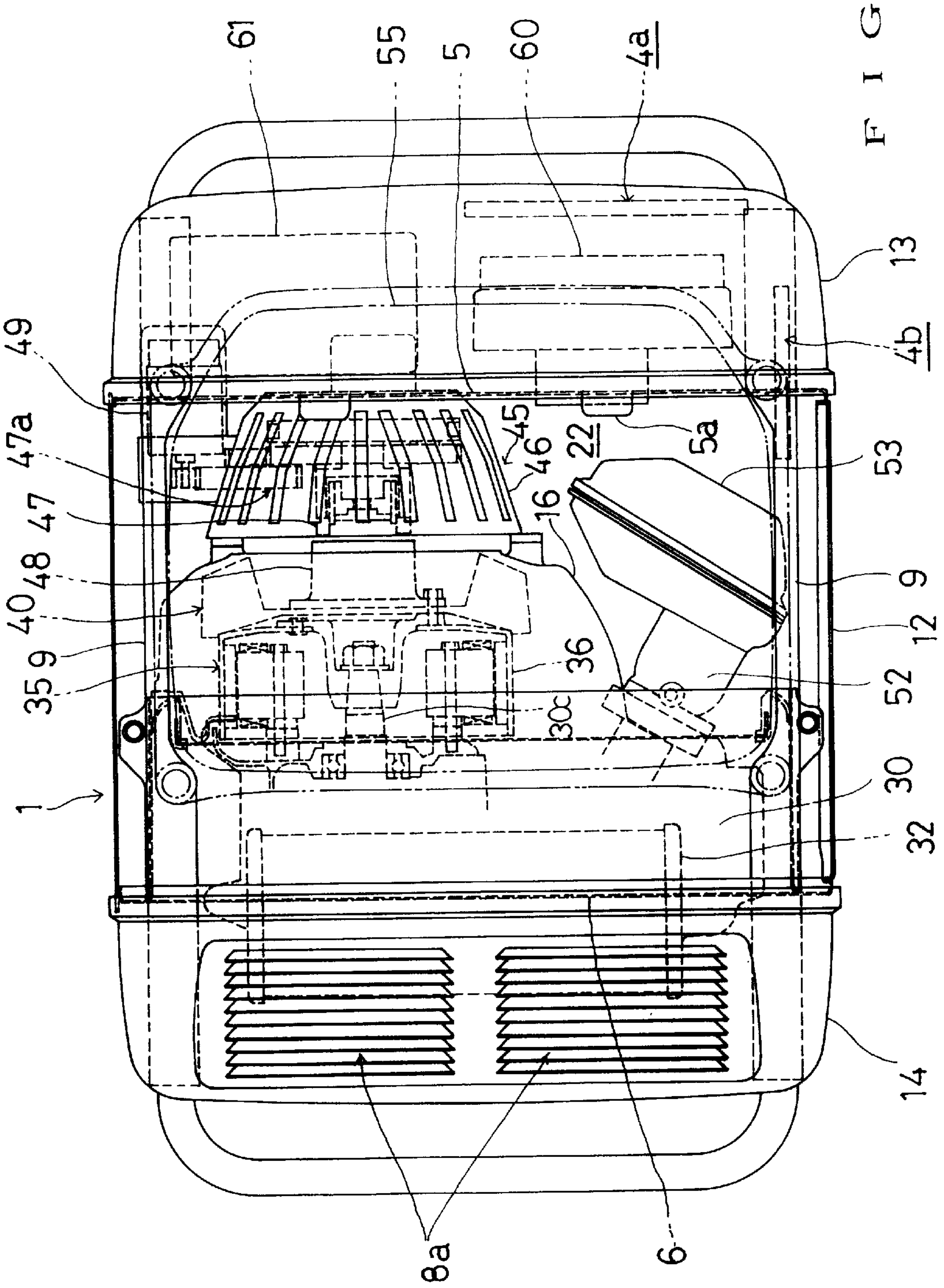
FIG. 3 is a plan view showing the engine-operated generator in which a center cover and a fuel tank are omitted and details are shown in broken lines.
Figure 4:
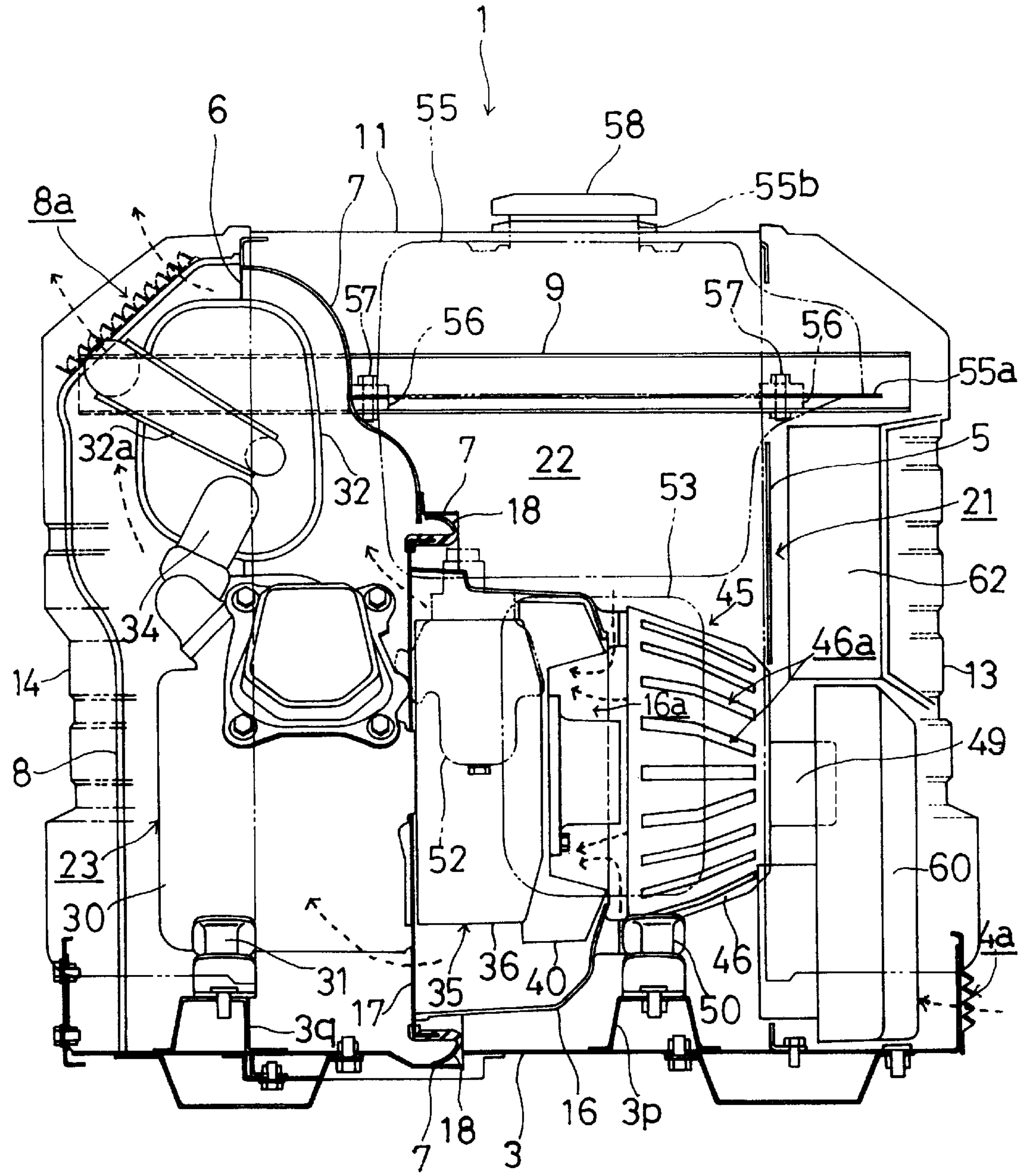
FIG. 4 is a side view of the engine-operated generator with parts omitted.

Referring to FIG. 3, the recoil starter 45 has a ratchet wheel 47 provided on a rotary shaft which is coaxial with the crankshaft 30*c* so as to be projected rearward. A ratchet 48 opposing to the ratchet wheel 47 is attached to a central part of the centrifugal fan 40

The ratchet wheel 47 is driven through a gear train 47*a* by a starter lever and also driven by a starter motor 49 provided at a left end of the starter case 46.

When the ratchet wheel 47 usually separated from the ratchet 48 is driven by the starter motor 49 for example, the ratchet wheel 47 projects rearward to engage with the ratchet 48 and the crankshaft 30*c* is rotated forcibly through the ratchet 48 and the outer-rotor 36 to start the engine 30.

The starter case 46 of the recoil starter 45 has a conical wall in which a plurality of slits 46*a* are formed arranged circumferentially. Cooling air is introduced into the suction opening 16*a* of the fan cover 16 through the space between the end face of the fan cover 16 and the starter case 46 and further through the slits 46*a*.

Figure 5:
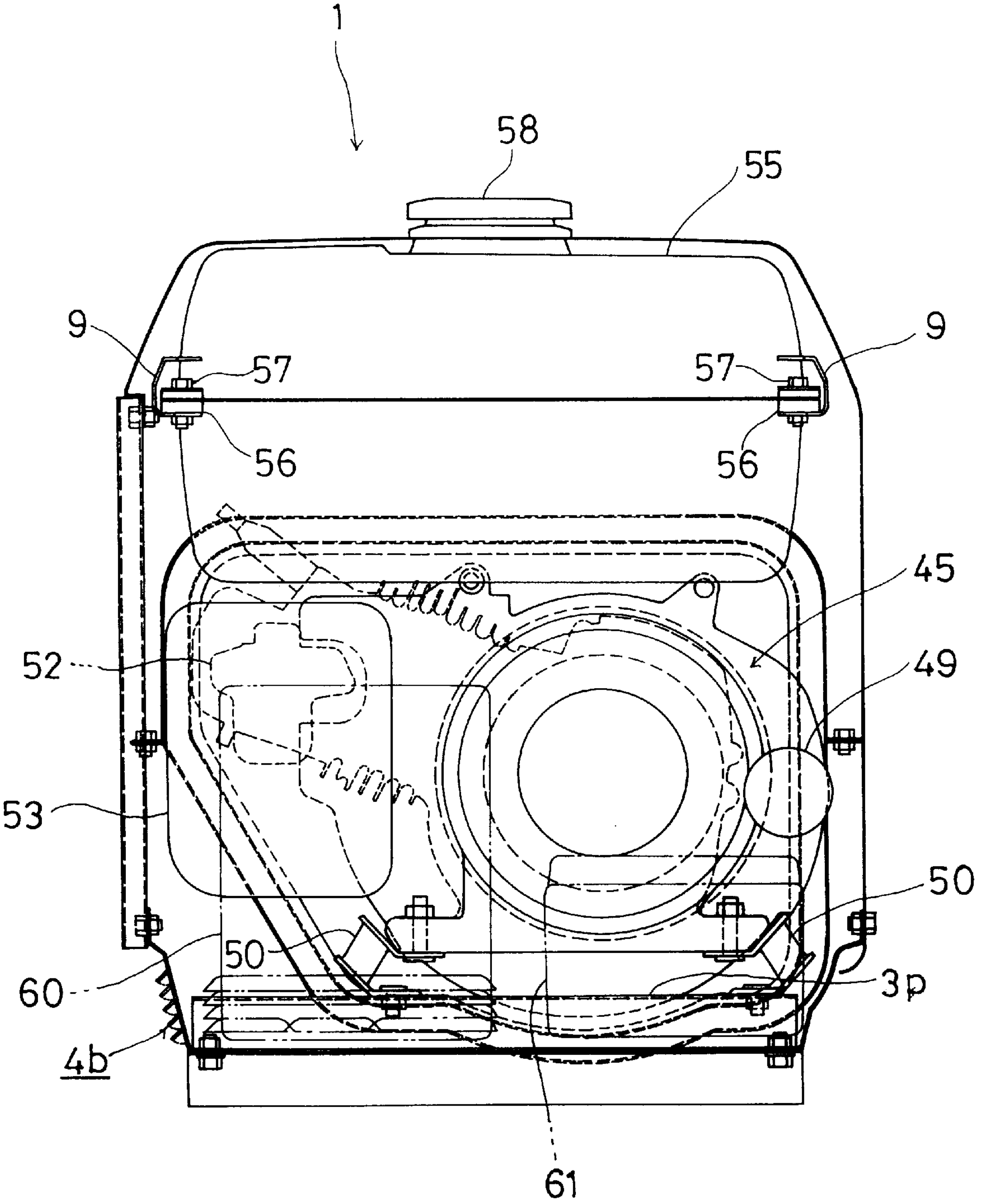
FIG. 5 is a front view thereof.

The recoil starter 45 is positioned in the center compartment 22 and supported by a pair of right and left vibrationproof mount members 50 fixed to the supporting member 3*p* on the under frame member 3 (FIGS. 4, 5).

The engine 30 and the recoil starter 45 are connected integrally by the fan cover 16 to constitute a vibratory unit. The engine 30 in the rear is supported by the vibrationproof mount member 31 and the recoil starter 45 in the front is supported by the vibrationproof mount member 50, so that the vibratory unit can be supported efficiently at positions near both front and rear end portions thereof.

Since the generator 35 and the recoil starter 45 are disposed in front of the crankcase 30*a* positioned left extending over the rear compartment 23 and the center compartment 22, there is formed a space on the right side of the fan cover 16 and the recoil starter 45 in the center compartment 22, and in this space are arranged a carburetor 52 and an air-cleaner 53 with the air-cleaner 53 positioned in front.

While the muffler 32 is disposed above the engine 30, the fuel tank 55 is disposed in a space above the fan cover 16, the recoil starter 45, the carburetor 52 and the air-cleaner 53 in the center compartment 22.

The fuel tank 55 is supported on the right and left reinforcing rails 9 laid between the front frame member 5 and the rear frame member 6 by means of a flange 55*a* fixed to the rails 9 by bolts 57 with vibrationproof rubbers 56 inserted.

A part of the fuel tank 55 is extruded into the front compartment 21 through the upper open hole 5*b* of the front frame member 5. The refueling mouth 55*b* of the fuel tank 55 is projected upward through the circular hole lid of the center cover 11 and a fuel cap 58 is screwed on an upper end of the refueling mouth 55*b*.

The fuel tank 55 is disposed in a space outside of the fan cover 16 and the duct 7 within the center compartment together with suction system instruments such as the carburetor 52 and the air-cleaner 53, and fuel system parts of the engine 30 are concentrated in the lump. Thus, the space is utilized efficiently and the apparatus is made compact.

In the flat rectangular space of the front compartment 21 covered by the front cover 13 in front of the front frame member 5, an inverter device 60 and a battery 61 is disposed right and left on the under frame member 3 and above them is provided a control panel 62 facing the front rectangular opening 13*a* of the front cover 13. Namely, electric instruments are concentrated in the front compartment 21.

The inverter device 60 converts output of the multipolar generator 35 into alternating current of a predetermined frequency. The inverter device 60 is disposed on the right side of the front compartment 21 near the suction holes 4*a*, 4*b* to be cooled by sucked outer air at the outset.

As described above, the engine-operated generator 1 having the soundproof case 2 is constructed in such a manner that the generator 35, the engine 30 and the muffler 32 are arranged in this order and accommodated in the ducts 7, 8 and the fan cover 16.

Figure 7:
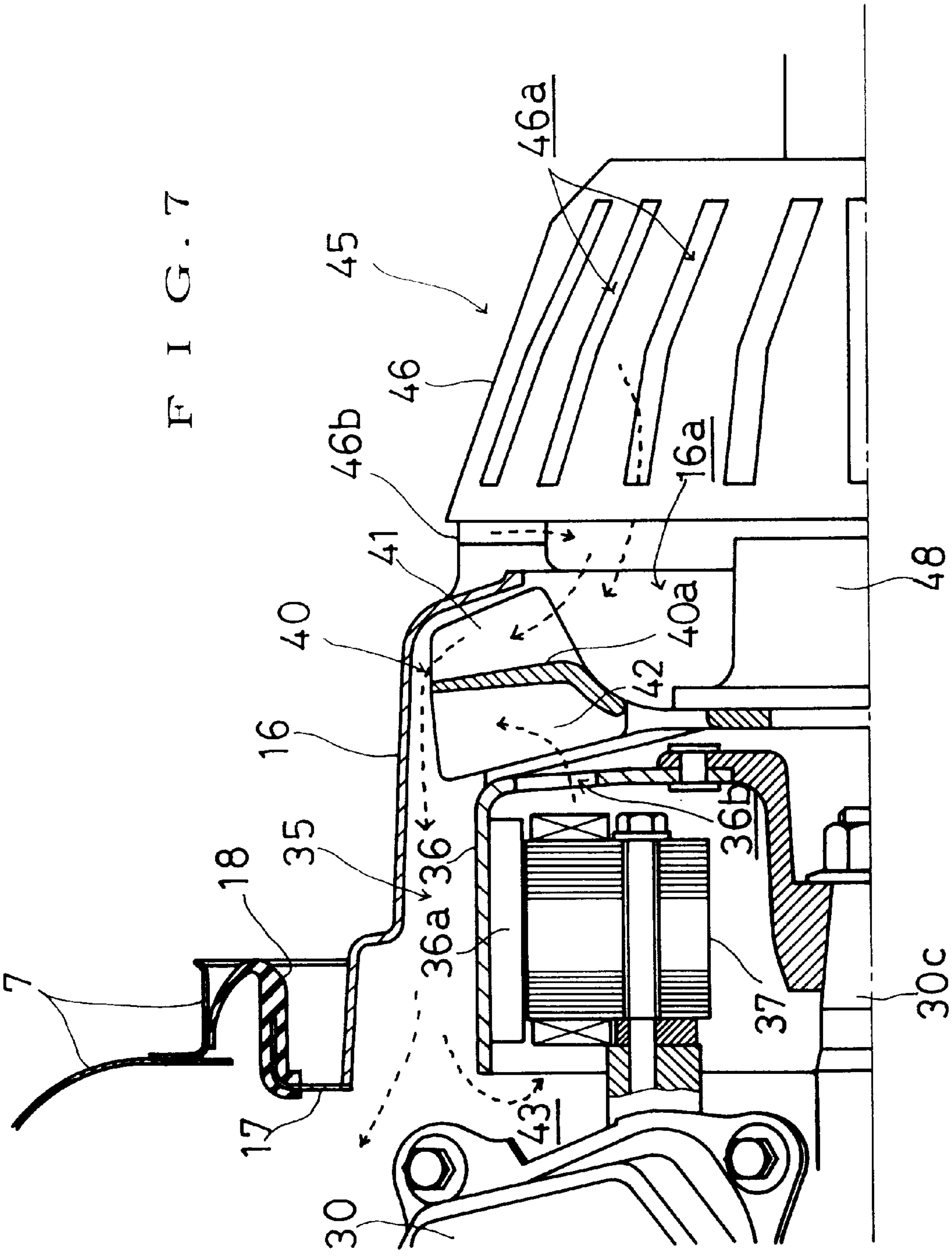
FIG. 7 is a side view showing partly by section the generator and vicinity thereof.

The suction opening 16*a* of the fan cover 16 opens into the center compartment 22 and the centrifugal fan 40 is provided inside of the suction opening 16*a*, so that by rotation of the centrifugal fan 40, air is introduced into the center compartment 22 through the front compartment 21 from the exterior of the soundproof case 2 and inhaled in the fan cover 16 through the slits 46*b* in the starter case 46 of the recoil starter 45, the space between the fan cover 16 and the starter case 46, and the suction opening 16*a* (streams of the air are shown by arrows of dotted line in FIGS. 4 and 7).

As shown in FIG. 7, air inhaled in the fan cover 16 through the suction opening 16*a* by the fan blade 41 on the front face of the centrifugal fan 40 flows along the inner peripheral surface of the fan cover 16 and the outside of the outer-rotor 36 of the generator 35 toward the engine 30 to cool the engine. However, a part of the air flowing toward the engine 30 is directed to the inside of the outer-rotor 36 through a space between the generator 35 and the engine 30 by action of the fan blade 42 on the rear face of the centrifugal fan 40 to cool the generating coil and returns to the centrifugal fan 40 through the ventilating holes 36*b* in the bottom wall of the outer-rotor 36 for recirculation.

The air introduced in the engine 30 including the above-mentioned recirculated air cools the engine and then flows upward guided by the ducts 7, 8 to cool the muffler 32 (FIG. 4). After cooling the muffler 32, the air is discharged to the exterior through the discharge opening 8*a* of the soundproof case 2 positioned above the muffler facing the exterior.

Since the center compartment 22 communicates with the front compartment 21 through the communication open hole 5*c* of the front frame member 5, air introduced from the exterior through the suction holes 4*a*, 4*b* into the front compartment 21 is inhaled in the center compartment 22. At that time, the front compartment 21 acts as a labyrinth duct for introducing exterior air which restrains leakage of suction noise occurring in the center compartment 22. The inverter device 60 is positioned in the course of the suction air stream from the suction holes 4*a*, 4*b* to be cooled effectively.

The generator 35, the engine 30 and the muffler 32, which are heat sources, are covered by the fan cover 16 and the ducts 7, 8 to be isolated from other instruments, and the air inhaled in the fan cover 16 by the centrifugal fan 40 through the suction opening 16*a* opening into the center compartment 22 cools firstly the generator 35 of relatively low temperature and then the engine 30 and the muffler 32 of higher temperature and is then discharged to the exterior through the discharge opening 8*a*. Therefore, an efficient cooling can be carried out.

Since the centrifugal fan 40 is attached to the outer-rotor 36 of the generator 30, the cooling fan 40 of large capacity can be furnished and a high fan supporting strength can be obtained.

Since the muffler 32 is disposed above the engine 30 in such a manner that the hotter instrument is positioned at the higher position and the discharge opening 8*a* is provided above the muffler 32, a reasonable cooling air stream can be generated for efficient cooling.

The above-mentioned ventilating construction having the generator 35, the engine 30 and the muffler 32 arranged in this order and covered by the fan cover 16 and the ducts 7, 8 is very simple. Since the engine 30 is disposed in the rear of the generator 35, the muffler 32 is disposed above the engine 30 and the cooling air passage formed by the ducts 7, 8 is bent in an L-shape, the size of the soundproof case 2 in front-rear direction can be made small, the space in the soundproof case 2 can be utilized efficiently for enabling arrangement of other instruments and the engine-operated generator can be made compact in its entirety.

Further, since the generator 35 is an outer-rotor type generator and the outer-rotor 35 serves as a flywheel of the engine 30, there is no need to provide a separate flywheel and the size of the engine-operated generator in the axial direction (front-rear direction) can be made small. Since output of the multipolar generator 35 is converted into alternating current of a predetermined frequency by the inverter 60, size of the generator itself in the axial direction can be made small.

In addition, since the cylinder 30*b* of the engine 30 is inclined sideways and the muffler 32 is disposed there above, the vertical size of the engine-operated generator can be restrained small while using the muffler 32 of a large capacity.

The engine 30 as a noise source is doubly covered by a duct composed of the duct 7 and the glass wool duct 8 and the soundproof case 2 on the outside of the duct, so that a high soundproof effect can be obtained.

Since the output of the multipolar generator 35 is converted into an alternating current of a predetermined frequency, there is no need to maintain the rotational speed constant regardless of the load in order to maintain the output frequency constant as in case of a synchronous generator which has been used in this kind of engine-operated generator. Therefore the rotational speed can be reduced when the load is not large to reduce operation noise greatly.

Although the presently preferred embodiment of the invention is described above, it will be understood by persons skilled in the art that variations and modifications may be made thereto without departing from the gist, spirit or essence of the invention. The scope of the invention is indicated by the appended claims.

What is claimed is:

1. An engine-operated generator unit having an engine and a generator driven by the engine arranged in a direction of a rotary shaft of the engine and accomodated in a soundproof case, wherein:

the generator, the engine, and a muffler are arranged in order within said soundproof case and covered by a duct which is separate from and which surrounds the generator, engine, and muffler so as to isolate said generator engine, and muffler from other instruments in said soundproof case;

said duct has an end opening on a side of said generator which opens on an interior of said soundproof case and another end opening on a side of said muffler communicating with an exterior of said soundproof case; and a cooling fan drivable by said engine so that air in said soundproof case is inhaled through the end opening of said duct on the side of said generator into said duct, substantially all of the inhaled air sequentially cools said generator, said engine, and said muffler in order and then is discharged through the other end opening of said duct on the side of said muffler to the exterior.

2. An engine-operated generator unit as claimed in claim 1, wherein said generator is an outer-rotor type generator having an outer-rotor which serves as a flywheel of said engine and said cooling fan is provided in said end opening of said duct on the side of said generator integrally with said outer-rotor.

3. An engine-operated generator unit as claimed in claim 2, wherein said generator is an outer-rotor type multipolar generator having a magnet rotor, and said generator further includes a control circuit for converting an output of said generator into an alternating current of a predetermined frequency.

4. An engine-operated generator unit as claimed in claim 2, wherein said engine has a cylinder inclined sideways obliquely and said muffler is disposed in a space above said cylinder.

5. An engine-operated generator unit as claimed in claim 4, wherein said muffler is substantially cylindrical and elongated in a direction perpendicular to the rotary shaft of said engine.

6. An engine-operated generator unit as claimed in claim 1, wherein said engine has a cylinder inclined sideways obliquely and said muffler is disposed in a space above said cylinder.

7. An engine-operated generator unit as claimed in claim 6, wherein said muffler is substantially cylindrical and elongated in a direction perpendicular to the rotary shaft of said engine.

8. A portable engine-operated generator unit comprising:

an engine having a rotary output shaft;

a generator drivably connected to the engine and arranged in a direction of the rotary shaft;

a muffler connected to said engine;

a soundproof case housing the engine, the generator, the muffler, and other components of the engine-operated generator unit in an ordered arrangement therein;

a duct disposed within the soundproof case, the duct surrounding the engine, the generator, and the muffler and isolating the engine, the generator, and the muffler from the other components of the engine-operated generator unit in said soundproof case;

said duct having a first end opening on a side of said generator which opens on an interior of said soundproof case and a second end opening on a side of said muffler communicating with an exterior of said soundproof case;

a cooling fan drivably connected to the engine for drawing air within the soundproof case, forcing the air through the first end opening of said duct into said duct and discharging the air through said second end opening of said duct; and said ordered arrangement of the generator, the engine, and the muffler is such that the air drawn through the first end opening of the duct by the cooling fan sequentially cools said generator, said engine, and said muffler in order and is then discharged through said second end opening of said duct to the exterior of the soundproof case.

9. A portable engine-operated generator unit as claimed in claim 8, wherein said generator is an outer-rotor type generator having an outer-rotor which serves as a flywheel of said engine, and said cooling fan is provided in said first end opening of said duct integrally with said outer-rotor.

10. A portable engine-operated generator unit as claimed in claim 9, wherein said generator is an outer-rotor type multipolar generator having a magnet rotor, and said unit further includes a control circuit for converting an output of said generator into an alternating current of a predetermined frequency.

11. A portable engine-operated generator unit as claimed in claim 8, wherein said engine has a cylinder inclined sideways obliquely and said muffler is disposed in a space above said cylinder.

12. A portable engine-operated generator as claimed in claim 11, wherein said muffler has an elongate, longitudinal dimension, and is disposed within the soundproof case such that the elongate, longitudinal dimension thereof extends in a direction perpendicular to the rotary shaft of said engine.

13. A portable engine-operated generator as claimed in claim 12, wherein said muffler is substantially cylindrical.

14. An engine-operated generator unit, comprising:

a hollow case;

an engine disposed within the case, the engine having a rotary shaft and having a muffler thereon;

a generator disposed within the case, the generator being driven by the engine and arranged in a direction of the rotary shaft of the engine;

duct means for channeling air, the duct means being disposed within the case surrounding and enclosing the engine, the generator, and the muffler so as to isolate the generator, engine, and muffler from other instruments in the case;

the duct means having an inlet opening on a side of the generator which opens on an interior of the case and a discharge opening on a side of the muffler communicating with an exterior of the case; and a cooling fan drivable by the engine so that air in the case is drawn into the inlet opening of said duct means, and sequentially cools the generator, the engine, and the muffler in order, and is then discharged through the discharge opening of said duct means.

15. The engine-operated generator unit of claim 14, wherein said duct means is substantially sealed in areas thereof other than said inlet and discharge openings.

* * * * *

UNITED STATES PATENT AND TRADEMARK OFFICE
CERTIFICATE OF CORRECTION

PATENT NO : 5,977,667

DATED : 02 November 1999

INVENTOR(S) : Tadafumi Hirose

It is certified that error appears in the above-identified patent and that said Letters Patent is hereby corrected as shown below:

On the cover page, under "[73] Assignee:", change "giken" to --Giken--;
in the "[57] ABSTRACT", line 3, after "efficiently" insert a comma;
line 4, before "has" insert --unit--;
line 14, after "through" insert --the--.

Column 3, line 56, change "lid" to --11d--.

Column 6, line 17, change "lid" to --11d--.

Column 7, lines 57-58, change "there above" to --thereabove--.

Column 8, line 16 (claim 1, line 3), change "accomodated" to --accommodated--;
line 22 (claim 1, line 9), after "generator" insert a comma.

Signed and Sealed this

Twentieth Day of June, 2000

Attest:

Q. TODD DICKINSON

*Attesting Officer* *Director of Patents and Trademarks*